US011978963B2

(12) United States Patent
Kadichevitz et al.

(10) Patent No.: US 11,978,963 B2
(45) Date of Patent: May 7, 2024

(54) BEAM DIVERSITY BY SMART ANTENNA WITH PASSIVE ELEMENTS

(71) Applicant: Huawei Technologies Co., Ltd., Shenzhen (CN)

(72) Inventors: Michael Kadichevitz, Hod Hasharon (IL); Doron Ezri, Hod Hasharon (IL); Avi Weitzman, Hod Hasharon (IL); Xiao Zhou, Shanghai (CN); Yi Chen, Chengdu (CN); Xin Luo, Chengdu (CN); Yuping Shu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 17/697,996

(22) Filed: Mar. 18, 2022

(65) Prior Publication Data

US 2022/0320754 A1 Oct. 6, 2022

Related U.S. Application Data

(63) Continuation of application No. PCT/EP2019/075026, filed on Sep. 18, 2019.

(51) Int. Cl.
*H01Q 1/38* (2006.01)
*H01Q 1/22* (2006.01)
(Continued)

(52) U.S. Cl.
CPC ............. *H01Q 21/205* (2013.01); *H01Q 9/16* (2013.01); *H01Q 19/24* (2013.01)

(58) Field of Classification Search
CPC .......... H01Q 1/2291; H01Q 1/28; H01Q 1/38; H01Q 9/065; H01Q 9/16; H01Q 21/062;
(Continued)

(56) References Cited

U.S. PATENT DOCUMENTS

| | | | |
|---|---|---|---|
| 5,235,343 | A | 8/1993 | Audren et al. |
| 7,123,205 | B2 | 10/2006 | Ratajczak et al. |

(Continued)

FOREIGN PATENT DOCUMENTS

| | | | |
|---|---|---|---|
| CN | 103346392 | A | 10/2013 |
| CN | 104134859 | A | 11/2014 |

(Continued)

OTHER PUBLICATIONS

Gao et al., "Horizontally Polarized 360° Beam-Steerable Frequency-Reconfigurable Antenna," IEEE Transactions on Antennas and Propagation, vol. 67, No. 8, pp. 5231-5242, XP011739521, Institute of Electrical and Electronics Engineers, New York, New York (Aug. 2019).

(Continued)

*Primary Examiner* — Haissa Philogene
(74) *Attorney, Agent, or Firm* — Leydig, Voit & Mayer, Ltd.

(57) ABSTRACT

An antenna device includes a plurality of dipole antennas and a port. Each of the dipole antennas is connected to the port. The dipole antennas are arranged around the port. Each of the dipole antennas comprises two ends. The device further includes a plurality of passive elements. The ends of the dipole antennas and the passive elements are interchangeably arranged around the port such that each of the passive elements is situated between ends of two different antennas from the plurality of dipole antennas. One or more switches are configured to switch between an omnidirectional state, in which the ends of the dipole antennas are not connected to the plurality of passive elements, and a directional state, in which at least one end of one of the passive elements is connected to at least one end of one of the antennas.

15 Claims, 13 Drawing Sheets

(51) Int. Cl.
*H01Q 9/16* (2006.01)
*H01Q 19/24* (2006.01)
*H01Q 21/20* (2006.01)

(58) Field of Classification Search
CPC ...... H01Q 21/205; H01Q 21/24; H01Q 21/28; H01Q 3/24
See application file for complete search history.

(56) References Cited

U.S. PATENT DOCUMENTS

| | | | | |
|---|---|---|---|---|
| 7,236,129 | B2 * | 6/2007 | Nilsson | H01Q 9/46 343/700 MS |
| 7,511,680 | B2 | 3/2009 | Shtrom et al. | |
| 7,675,474 | B2 | 3/2010 | Shtrom et al. | |
| 7,696,946 | B2 | 4/2010 | Shtrom | |
| 7,880,683 | B2 | 2/2011 | Shtrom et al. | |
| 8,031,129 | B2 | 10/2011 | Shtrom et al. | |
| 10,135,119 | B2 * | 11/2018 | Ku | H01Q 9/065 |
| 10,181,655 | B2 | 1/2019 | Shtrom et al. | |
| 10,573,958 | B2 * | 2/2020 | Wang | H01P 1/127 |
| 2004/0257292 | A1 | 12/2004 | Wang | |
| 2005/0227658 | A1 * | 10/2005 | Saliga | H01Q 3/18 455/272 |
| 2006/0038734 | A1 | 2/2006 | Shtrom et al. | |
| 2010/0103066 | A1 | 4/2010 | Shtrom et al. | |
| 2011/0193652 | A1 * | 8/2011 | Wu | H01Q 21/08 333/101 |
| 2012/0086616 | A1 | 4/2012 | Park et al. | |
| 2015/0288064 | A1 | 10/2015 | Su et al. | |
| 2015/0349418 | A1 * | 12/2015 | Patron | H01Q 3/44 343/836 |
| 2016/0149314 | A1 * | 5/2016 | Helander | H01Q 5/48 343/816 |
| 2016/0204518 | A1 * | 7/2016 | Yamagajo | H01Q 21/24 343/809 |
| 2017/0040711 | A1 | 2/2017 | Rakib et al. | |
| 2019/0097307 | A1 * | 3/2019 | Lee | H01Q 1/243 |
| 2019/0214726 | A1 * | 7/2019 | Yamagajo | H01Q 21/12 |
| 2020/0091990 | A1 * | 3/2020 | Ho | H01Q 21/062 |
| 2020/0381844 | A1 * | 12/2020 | Kim | H01Q 3/28 |

FOREIGN PATENT DOCUMENTS

| | | | |
|---|---|---|---|
| CN | 107196044 | A | 9/2017 |
| CN | 207217750 | U | 4/2018 |
| CN | 108092007 | A | 5/2018 |
| DE | 102008003532 | A1 | 3/2009 |
| FR | 2863109 | A1 | 6/2005 |
| JP | S6125304 | A | 2/1986 |
| WO | 2005109572 | A1 | 11/2005 |
| WO | 2011058378 | A1 | 5/2011 |

OTHER PUBLICATIONS

Nguyen et al., “Enabling Synchronous Directional Channel Access on SDRs for Spectrum Sharing Applications,” WiNTECH ’16: Proceedings of the Tenth ACM International Workshop on Wireless Network Testbeds, Experimental Evaluation, and Characterization, pp. 57-64, XP058280193, New York City, NY, USA (Oct. 2016).

* cited by examiner

| Region | 42 | 43 | 44 | 45 | 46 |
|---|---|---|---|---|---|
| E Field (V/m) | 100 – 1,680 | 1,680 - 3,787 | 3,787- 5,893 | 5,893 – 6,947 | 6,947 – 8,000 |

| Region | 51 | 52 | 53 | 54 | 55 | 56 |
|---|---|---|---|---|---|---|
| dB (Realized Gain in Total) | -23.911 - - 14.342 | -14.342 - - 4.7726 | -4.7726 ~ 1.1967 | 1.1967 ~ 2.4042 | 2.4042 ~ 4.7965 | 4.7695 |

| Region | 42 | 43 | 44 | 45 | 46 |
|---|---|---|---|---|---|
| E Field (V/m) | 100 ~ 1,680 | 1,680 - 3,787 | 3,787- 5,893 | 5,893 ~ 6,947 | 6,947 ~ 8,000 |

| Region | 64 | 66 | 68 | 70 | 72 | 74 |
|---|---|---|---|---|---|---|
| dB (Realized Gain in Total) | 8.0800 | 4.9404 - 8.0800 | -1.3388 – 4.9404 | -4.4783 - - 1.3388 | -7.6179 - - 4.4783 | -20.176 - 7.6179 |

BEAM DIVERSITY BY SMART ANTENNA WITH PASSIVE ELEMENTS

CROSS-REFERENCE TO RELATED APPLICATIONS

This application is a continuation of International Application No. PCT/EP2019/075026, filed on Sep. 18, 2019, the disclosure of which is hereby incorporated by reference in its entirety.

FIELD

The present disclosure, in some embodiments thereof, relates to an antenna device, and, more specifically, but not exclusively, to an antenna device that may be used with a Wi-Fi access point.

BACKGROUND

This application is related to PCT Application entitled "Beam Diversity by Smart Antenna Without Passive Elements," PCT/EP2019/075030, by the same inventors as the present application, filed on herewith date, the contents of which are incorporated by reference as if fully set forth herein.

Wi-Fi is a wireless local area network (LAN) standard, based on the IEEE standard 802.11, which is widely used in home, offices and other indoor/outdoor environments. Wi-Fi operates in 2 frequency bands, 2.4 GHz band and 5 GHz band, and manages the communication between an Access point and clients (computers, smart handset, various devices, etc.). The Wi-Fi protocol was developed to provide service to numerous users at arbitrary locations of the Access point's coverage area. In other words, the Access point needs to cover the entire area of its operation. For that reason, a Wi-Fi antenna typically has an omnidirectional beam for wide coverage.

The ultimate goal of any Wi-Fi system is to provide the highest possible throughput for each user. This goal requires a strong signal, to enable a good Signal to Interference and Noise Ratio (SINR). This goal also requires, when necessary, a narrow, directional beam, which may be directed with high gain in the direction of a particular user, while reducing the interference to other cells. Thus, an ideal Wi-Fi access point should be able to alternately emit an omnidirectional beam and to emit a narrow, directional beam.

There can be various solutions for alternating or diversifying beam coverage in Wi-Fi antennas. One such solution is based on the use of reflectors and directors. The principle of operation of such Wi-Fi antennas is based on the Yagi-Uda antenna. A Yagi-Uda antenna is a directional antenna consisting of multiple parallel elements in a line, usually half-wave dipoles made of metal rods. Yagi-Uda antennas consist of a single driven element connected to the transmitter or receiver with a transmission line, and additional parasitic elements which are not connected to the transmitter or receiver: a reflector and one or more directors. The reflector and director absorb and re-radiate the radio waves from the driven element with a different phase, modifying the dipole's radiation pattern. The waves from the multiple elements superpose and interfere to enhance radiation in a single direction, achieving a very substantial directional increase in the antenna's gain.

The Yagi-Uda concept has been applied for antenna elements of Wi-Fi Access points to enable the Access point to emit different signal patterns. For example, a Wi-Fi access point may consist of a structure with one active element having two vertical bi-conical dipoles at the center of the structure, and a very large number of passive elements arranged in several circular arrays of different radiuses around it. Each passive element is made of several very short metal sections (e.g., shorter than ⅕ of a wavelength) which may be either shorted by diodes to one long passive element (around 0.5 wavelength) or left open. Shorting the passive elements thus changes them from directors to a reflector, and thereby changes the directional gain of the Wi-Fi access points. In another example, various passive elements may be arranged in series, with diodes configured therebetween. When the diodes are off, the passive elements act as directors. When the diodes are on, the length of the passive part is enlarged, and it acts as a reflector.

Another model for modifying the transmission of Wi-Fi access points can involve selectively activating one of a plurality of radiating dipoles, each of which is attached to a ground component. The selection of the active dipole or dipoles may be done by operating series switches, e.g., diodes, on the feeding line of each dipole near its input. The radiating dipoles are of different sizes or configurations. Each dipole may be chosen depending on the type or characteristics of the signal that is desired.

Another model for diversifying the signal at Wi-Fi access points involves integrating both horizontally and vertically polarized elements within a single Wi-Fi access point. This model does not alter any signal characteristics, but rather integrates various signals into a single Access point.

SUMMARY

The foregoing models for modifying the signals in Wi-Fi antennas all rely on the inclusion of additional, space-consuming elements in the antenna system. For example, reliance on the Yagi-Uda principle requires inclusion of a large number of passive devices to serve as directors and reflectors. Similarly, selection from a plurality of radiating dipoles requires inclusion of additional radiating dipoles. In addition, use of both horizontally and vertically polarized elements adds one or more radiating dipole into the access point, and is not useful for a standard Wi-Fi access point, in which there is a single antenna that is only horizontally or vertically polarized.

In addition, above-described models, with their various additional passive elements, active dipoles, and/or antennas with multiple polarizations, require an access point with a larger area or footprint. The excess space is a particularly important consideration for enterprise-grade Wi-Fi access points. An enterprise-grade Wi-Fi access point supports two or three bands, with 8 or 16 antennas for 5 GHz, and an additional four antennas for 2.4 GHz. The additional elements required for each of the antennas would thus greatly enlarge the size requirements of the antenna device.

Accordingly, the present inventors have recognized that there is a need for a smart antenna device that provides the ability to alternate radiating beams between omnidirectional coverage and directional beam coverage. There is, the present inventors have recognized, additionally a need for a smart antenna device that can respond to dynamic changes in the operational environment, in order to select properly when to utilize the omnidirectional beam coverage or the directional beam coverage. In addition the inventors have recognized that, there is a need for a smart antenna device that incorporates an antenna, which occupies a minimum of space.

Aspects of the present disclosure, therefore, provide a smart antenna device with the ability to alternate radiating beams between omnidirectional coverage and directional beam coverage pointing to a specific sector within a coverage area.

According to a first aspect, an antenna device comprises a plurality of dipole antennas and a port. Each of the dipole antennas is connected to the port, and the plurality of dipole antennas are arranged around the port. Each of the plurality of dipole antennas comprises two ends. The antenna device further comprises a plurality of passive elements. The ends of the plurality of dipole antennas and the plurality of passive elements are interchangeably arranged around the port, such that each of the plurality of passive elements is situated between ends of two different antennas from the plurality of dipole antennas. One or more switches are configured to switch between an omnidirectional state, in which the ends of the dipole antennas are not connected to the plurality of passive elements, and a directional state, in which at least one end of one of the plurality of passive elements is connected to at least one end of one of the plurality of antennas.

An advantage of this aspect is that the antenna device may be switched between omnidirectional state and the directional state using only passive elements that are situated on the perimeter of the array of dipole antennas. This permits mode switching without increasing the space requirement of the antenna device. In the omnidirectional state, when the dipole antennas are not connected to each other, the antenna device provides a high gain pattern in the azimuthal plane. The antenna device is also convertible to a high gain directional pattern in the azimuthal plane, when two ends in each of one or more of the pairs are connected to each other.

In an implementation of the antenna device according to the first aspect, in the directional state, at least two ends of one of the plurality of passive elements are connected to two different antennas, thereby converting the two different antennas into a single long radiating element having two feeding points. Advantageously, the at least two combined dipole antennas thus function as a single long radiating element antenna, thereby increasing the directional gain.

In another possible implementation of the antenna device according to the first aspect, the plurality of dipole antennas and the plurality of passive elements are arranged around the port in a substantially rectangular or substantially circular orientation. Advantageously, these exemplary orientations are well suited for providing an omnidirectional signal.

In another possible implementation of the antenna device according to the first aspect, the plurality of dipole antennas are arranged horizontally above a ground plane. The ground plane may serve as a reflecting surface for the antenna waves of the dipole antenna to increase the gain of the antenna device, in both the omnidirectional and directional states.

In another possible implementation of the antenna device according to the first aspect, the plurality of dipole antennas comprises at least three dipole antennas. A minimum of three dipole antennas are used to distinguish between the omnidirectional state, when none of the antennas are connected to each other, and the directional state, when at least two of the antennas are connected to each other and at least one is not connected.

In another possible embodiment of the antenna device according to the first aspect, the gain in the entire azimuth plane is at least 4 dBi. This gain in the azimuth plane enables the antenna to be used to transmit a Wi-Fi signal to a suitably large area.

In another possible implementation of the antenna device according to the first aspect, the difference in gain between the omnidirectional state and the directional state is at least 3 dB. Advantageously, the difference in gain in the desired direction in the directional state, as compared to the gain in that direction in the omnidirectional state, is suitably significant.

In another possible implementation of the antenna device according to the first aspect, the antenna device further comprises electronic circuitry for connecting and disconnecting each passive element and adjacent antenna, and a control algorithm for determining which passive element to connect to an adjacent antenna, in order to steer an antenna beam of the antenna device in a directional state towards a location of one or more mobile devices. In this implementation, the antenna device is thus part of a smart antenna that may be toggled back and forth between the omnidirectional and directional states according to the needs of the environment, e.g., the location of mobile devices within a given range of the antenna device.

In another possible implementation of the antenna device according to the first aspect, the one or more switches comprise at least one of a diode, a transistor, and an electronic switch. The switches may be integrated with the control algorithm for toggling the smart antenna between the omnidirectional and directional states.

In a second aspect of the disclosure, a method for switching an antenna device from an omnidirectional state to a directional state is disclosed. The antenna device comprises a plurality of dipole antennas and a port. Each of the dipole antennas is connected to the port. The plurality of dipole antennas are arranged around the port. Each of the plurality of dipole antennas comprises two ends. The antenna device further comprises a plurality of passive elements interchangeably arranged around the port such that each of the plurality of passive elements is situated between two different antennas from the plurality of dipole antennas. The antenna device further comprises one or more switches configured to switch between (1) an omnidirectional state, in which the ends of the dipole antennas are not connected to the plurality of passive elements; and (2) a directional state, in which at least one of the plurality of passive elements is connected to at least one end of one of the plurality of dipole antennas. The method comprises operating the one or more switches to connect at least one end of the at least one of the plurality of passive elements to at least one end of the plurality of dipole antennas, and thereby switching the antenna device from the omnidirectional state to the directional state.

An advantage of this aspect is that the method may be used to switch the antenna device between the omnidirectional state and the directional state using only passive elements that are situated on the perimeter of the array of dipole antennas. This permits mode switching without increasing the space requirement of the antenna device. In the omnidirectional state, when the dipole antennas are not connected to each other, the antenna device provides a high gain pattern in the azimuthal plane. The antenna device is also convertible to a high gain directional pattern in the azimuthal plane, when two ends in each of one or more of the pairs are connected to each other.

In an implementation of the method according to the second aspect, the method comprises connecting at least one of the plurality of passive elements to two different antennas, thereby converting the two different antennas into a single long radiating element having two feeding points. Advantageously, in the directional state, the at least two combined dipole antennas thus function as a single long radiating element antenna.

In an implementation of the method according to the second aspect, the method further comprises increasing the gain between the omnidirectional state and the directional state in at least one direction by at least 3 dB. Advantageously, the difference in gain in the desired direction in the directional state, as compared to the gain in that direction in the omnidirectional state, is suitably significant.

In an implementation of the method according to the second aspect, the method further comprises determining which direction to steer an antenna beam of the antenna device towards a location of one or more mobile devices. In this implementation, the antenna device is part of a smart antenna that may be toggled back and forth between the omnidirectional and directional states according to the needs of the environment, e.g., the location of mobile devices within a given range of the antenna device.

In a further implementation of the method according to the second aspect, the method further comprises determining when to revert the antenna device back to the omnidirectional state, and operating the one or more switches, and thereby switching the antenna device back from the directional state to the omnidirectional state. In this implementation, the antenna device is part of a smart antenna that may be toggled back and forth between the omnidirectional and directional states according to the needs of the environment, e.g., the location of mobile devices within a given range of the antenna device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
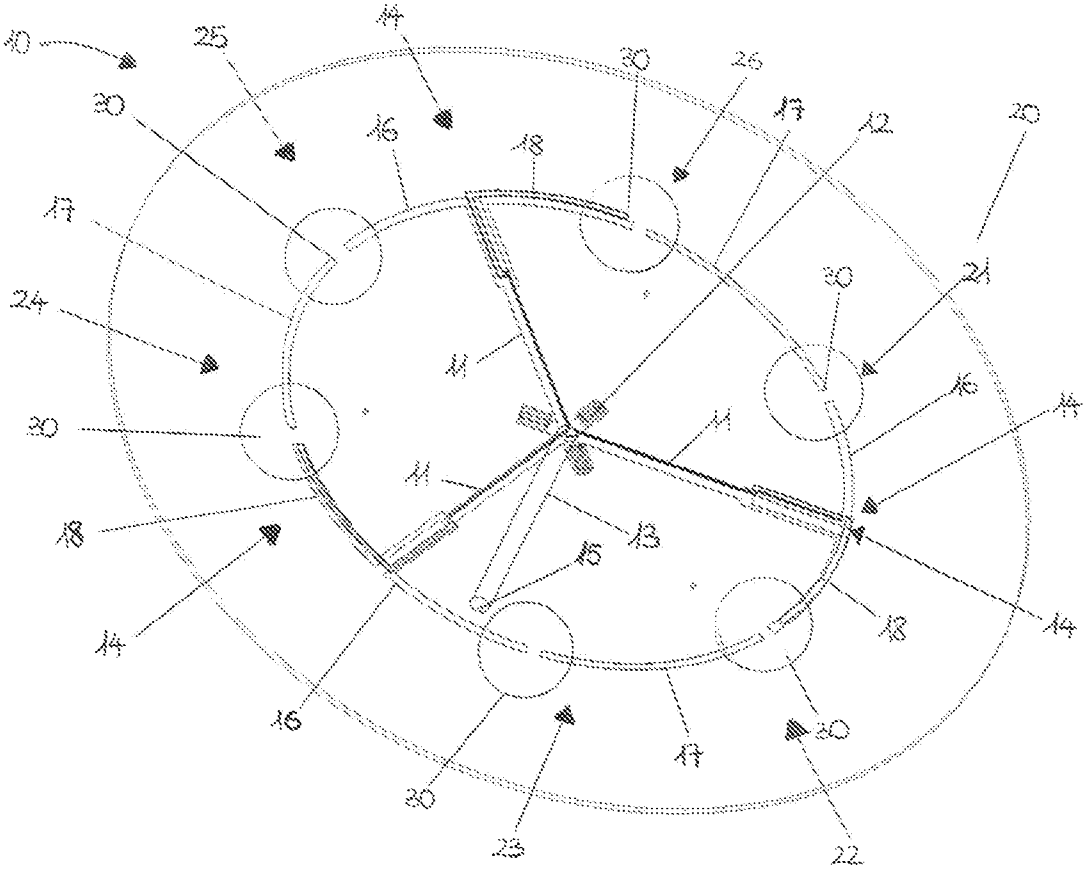
FIG. 1 is a depiction of an antenna device in an omnidirectional state, according to some embodiments of the present disclosure.

The present disclosure, in some embodiments thereof, relates to an antenna device, and, more specifically, but not exclusively, to an antenna device that may be used with a Wi-Fi access point.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. Aspects of the disclosure are capable of being implemented as other embodiments or of being practiced or carried out in various ways.

Referring to FIG. 1, antenna device 10 comprises a plurality of dipole antennas 14, each electrically connected to port 12. The port 12 is electrically connected via conducting wire 13 to power source 15. The plurality of dipole antennas 14 may be arranged on an FR-4 substrate, or on any other suitable substrate, such as a printed circuit board. The plurality of dipole antennas are arranged horizontally above a ground plane 20. Ground plane 20 is a flat or nearly flat horizontal conducting surface extending underneath the dipole antennas 14. For purposes of clarity, ground plane 20 may extend further outwards in all directions, and may have any suitable dimension. The ground plane may serve as a reflecting surface for the antenna waves of the dipole antennas 14, to increase the gain of the antenna device 10.

In the illustrated embodiment, there are three dipole antennas 14. The choice of three dipole antennas 14 is merely exemplary, and there may be fewer or more dipole antennas 14. In a preferred embodiment, there are at least three dipole antennas 14. Each dipole antenna 14 is configured asymmetrically, with a feeding arm 11 connecting to the port 12, and arms 16 and 18. In the depicted embodiment, arms 16 and 18 are approximately equal in length. However, arms 16 and 18 may also be asymmetrical. The dipole antenna 14 may have a total length that is half of the wavelength of the transmitted signal. Thus, for example, for a signal transmitted at 5 GHz, the wavelength is 60 mm in free space and about 30 mm on the FR4 substrate, and the total length of both arms of dipole antenna 14, printed on the FR4 substrate, is about 15 mm.

The dipole antennas 14 are configured around the port 12 in a closed shape. In the illustrated embodiment, the closed shape is a circle; however, the closed shape may also be a rectangle, or any other polygon.

Passive elements 17 are configured between arms 16, 18 of the antennas. Passive elements 17 are metal strips. The passive elements 17 are configured on the perimeter of a circular or polygonal array around port 12. The length of each passive element is also approximately half of the transmitted wavelength, e.g., 15 mm for a 5 GHz signal.

Passive elements 17 are configured adjacent to arms 16, 18 of dipole antenna 14. The passive elements 17 and the arms 16, 18 define junction points around the perimeter of the antenna array. In the illustrated embodiment, in which there are three antennas 14, there are six junction points, 21, 22, 23, 24, 25, and 26. The ends of arms 16, 18 are either above the corresponding passive element 17 or in the same plane almost touching the passive element 17.

A switch 30 is arranged at each of the junction points 21-26. The switch 30 comprises electronic circuitry for connecting and disconnecting the passive elements 17 and the adjacent arms 16, 18 of the dipole antennas 14. This electronic circuitry may be, for example, a diode, a transistor, and/or an electronic switch. The switch 30 is switchable between an "on" position, in which the electronic circuitry forms a closed, or shorted, circuit between the adjacent passive elements 17 and arms 16, 18, and an "off" position, in which the passive elements 17 and arms 16, 18 remain unconnected. In the embodiment of FIG. 1, each switch 30 is depicted as an open circle, indicating that it is in the "off" position. The switches 30 may be connected to a remote processor with a control algorithm for determining whether to operate switch 30 at each of the junction points 21-26. The remote processor and control algorithm may be used to toggle the antenna device 10 back and forth between the omnidirectional state and a directional state, as will be discussed further herein.

In the embodiment of FIG. 1, because each switch 30 is in the "off" position, the antenna device 10 has an identical configuration throughout the entire circumference of antenna device 10. For this reason, antenna device 10 generates an omnidirectional electric field, as will be discussed in connection with FIGS. 2-4, and is said to be in an omnidirectional state.

Figure 2:
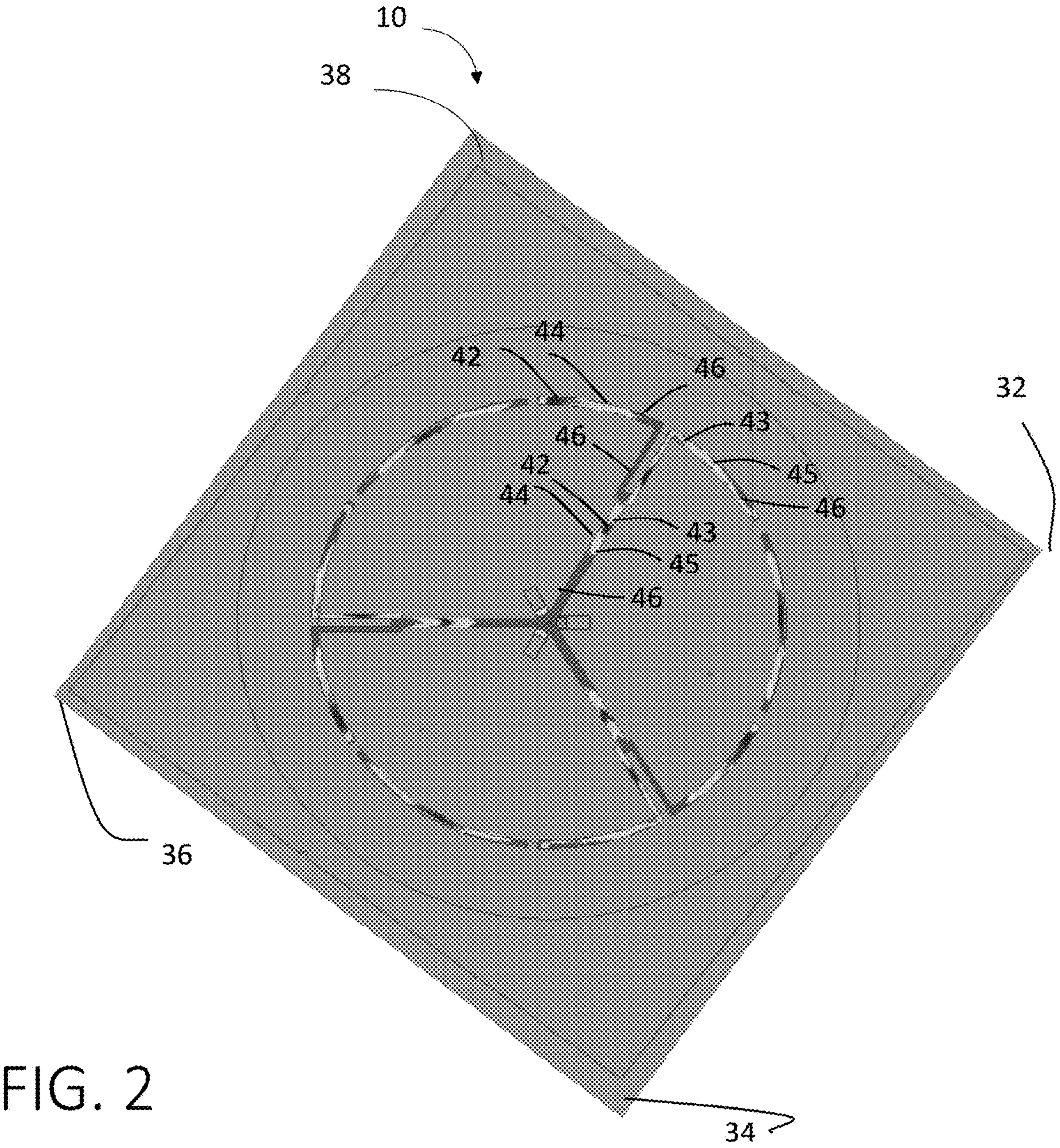
FIG. 2 is a depiction of the near electric field generated by the antenna device of FIG. 1 in the omnidirectional state, according to some embodiments of the disclosure.

FIG. 2 depicts an electric field that is generated along each dipole antenna 14, when the antenna device 10 is in the omnidirectional state. The strength of the electric field is measured in Volts per meter (V/m). For purposes of illustration, the strength of the electric field is divided into five regions. It is to be recognized that the variations in electric field across antenna device 10 are continuous, rather than discrete, and the following approximations of electric field for each particular region are for purposes of general explanation only. In region 42, both on feeding arms 11 and on the perimeter of antenna device 10 (both the region of arms 16, 18 and the passive elements 17, which is unconnected to the rest of antenna device 10) the electric field is between 100 and 1,680 V/m. In region 43, both on feeding arms 11 and on the perimeter of antenna device 10, the electric field is between 1,680 and 3,787 V/m. In region 44, both on feeding arm 11 and on the perimeter of the antenna device 10, the electric field is between 3,787 and 5,893 V/m. In region 45, both on feeding arm 11 and on the perimeter of antenna device 10, the electric field is between 5,893-6,947 V/m. Finally, at region 46, corresponding to the portion of the dipole antennas 14 closest to port 12, and also at a small portion of the antenna arms 16, the electric field is between 6,947 and 8,000 V/m. As can be seen, the electric field is symmetrical around the perimeter of antennas 14, and there is no meaningful distinction in the electric field at corners 32, 34, 36, and 38 of antenna device 10.

Figure 3:
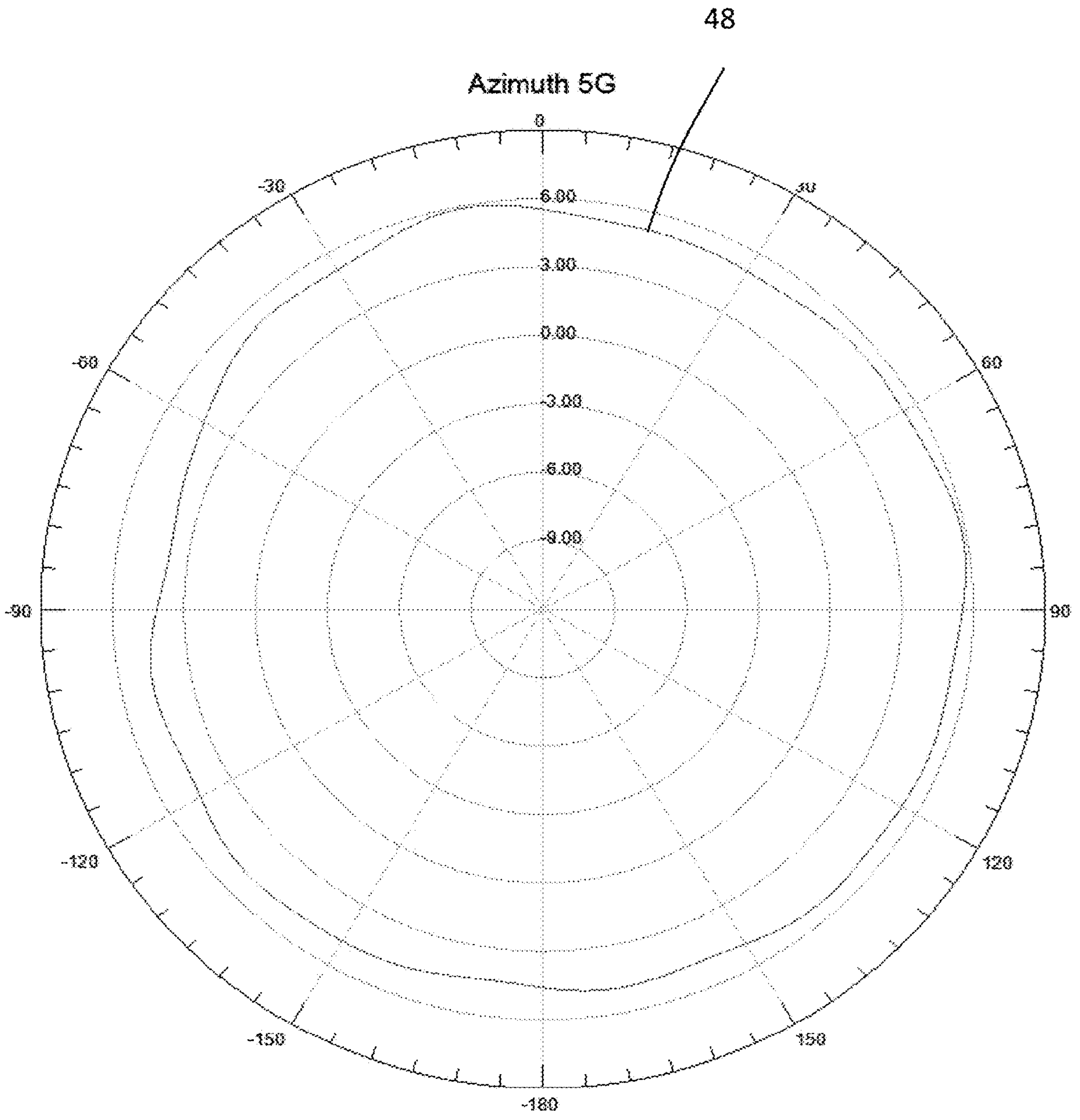
FIG. 3 is a depiction of the far electric field generated by the antenna device of FIG. 1 in the omnidirectional state, taken in the azimuthal plane at θ=135°, according to some embodiments of the disclosure.

FIG. 3 depicts the far electric field generated by antenna device 10 in the omnidirectional state. Far electric field 48 is measured in dBi as the azimuthal plane pattern, at frequency of 5.5 GHz, with theta at 135°. As can be seen, far electric field 48 is measured at more than 4 dBi, and nearly 6 dBi, throughout the circumference of the azimuthal plane. The reason that the far electric field 48 has an omnidirectional profile is because the near electric field shown in FIG. 2 has circular symmetry. As a result, far field 48 has a low ripple omnidirectional pattern.

Figure 4A:
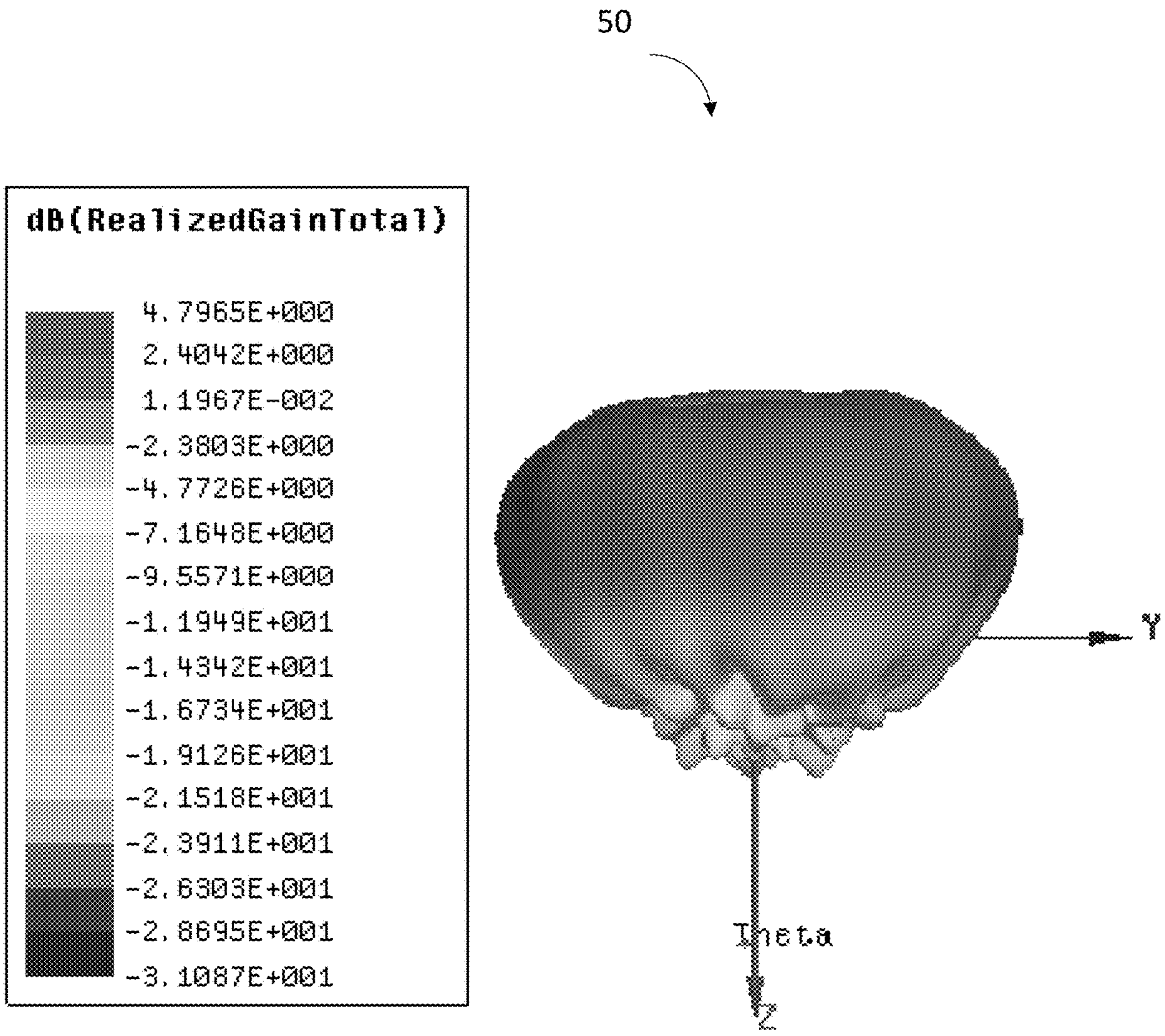
FIGS. 4A and 4B are depictions of the realized gain in total of the antenna device of FIG. 1, measured spherically around the antenna device, according to some embodiments of the disclosure.
Figure 4B:
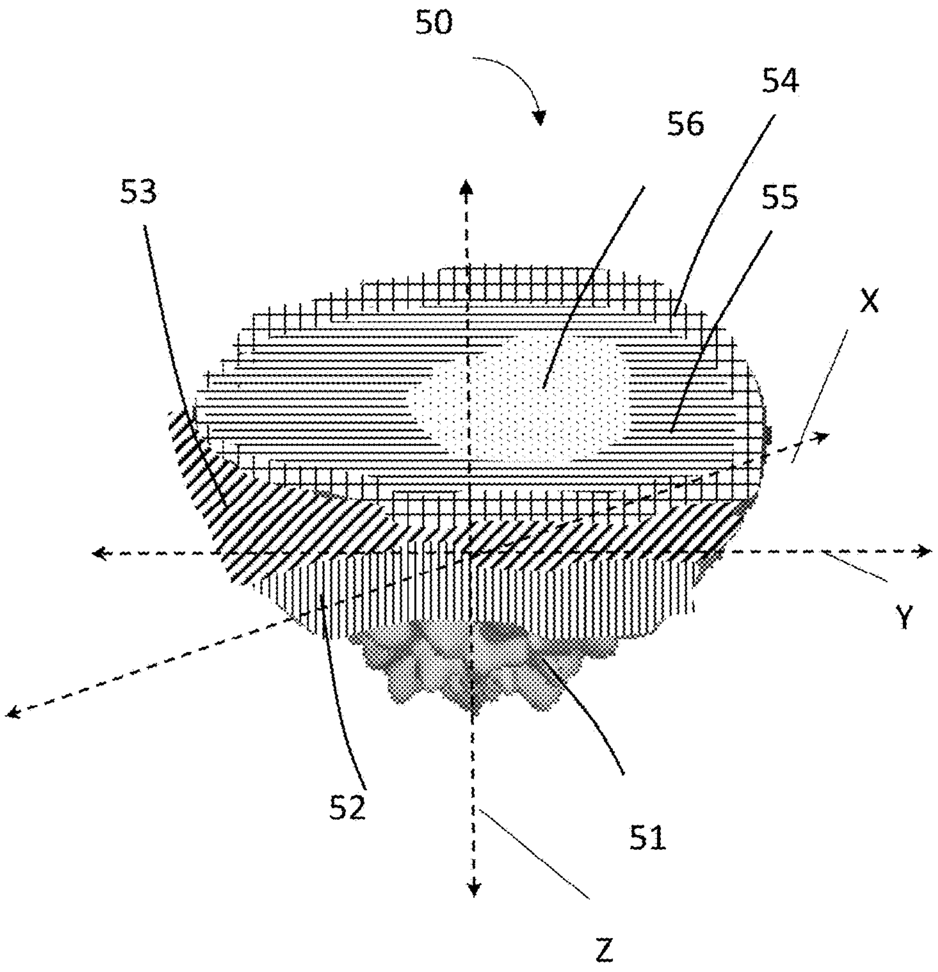

FIGS. 4A and 4B depict the gain 50 generated by the antenna device 10 in the omnidirectional state. FIG. 4A illustrates the shape of the gain 50 profile in three dimensions, and FIG. 4B depicts the values of the gain 50 for various regions in the 3 dimensional profile, expressed in dBi. As can be seen in FIGS. 4A and 4B, in the omnidirectional state, the gain 50 can be measured along an approximately ellipsoidal plot. In addition, as seen best in FIG. 4A, the gain is approximately equivalent at each point along the azimuthal plane (i.e., a cross section taken along the X-Y planes). As seen in FIG. 4B, the realized gain in region 51 is −23.911 to −14.342 dBi; in region 52, the realized gain is between −14.432 and −4.7726 dBi; in region 53, the realized gain is between −4.7226 dBi and 1.1967 dBi; in region 54, the realized gain is between 1.1967 to 2.4042 dBi; in region 55, which is the largest region, the realized gain is between 2.2042 dBi and 4.7965 dBi; and in region 56, the realized gain is around 4.7965 dBi. The differences in gain across the 3-dimensional profile are continuous, rather than discrete, and the regions 51-56 are drawn for purposes of general illustration only. FIGS. 4A and 4B demonstrate that the antenna device 10 may generate a gain of at least 4 dBi in 3 dimensions.

Figure 5:
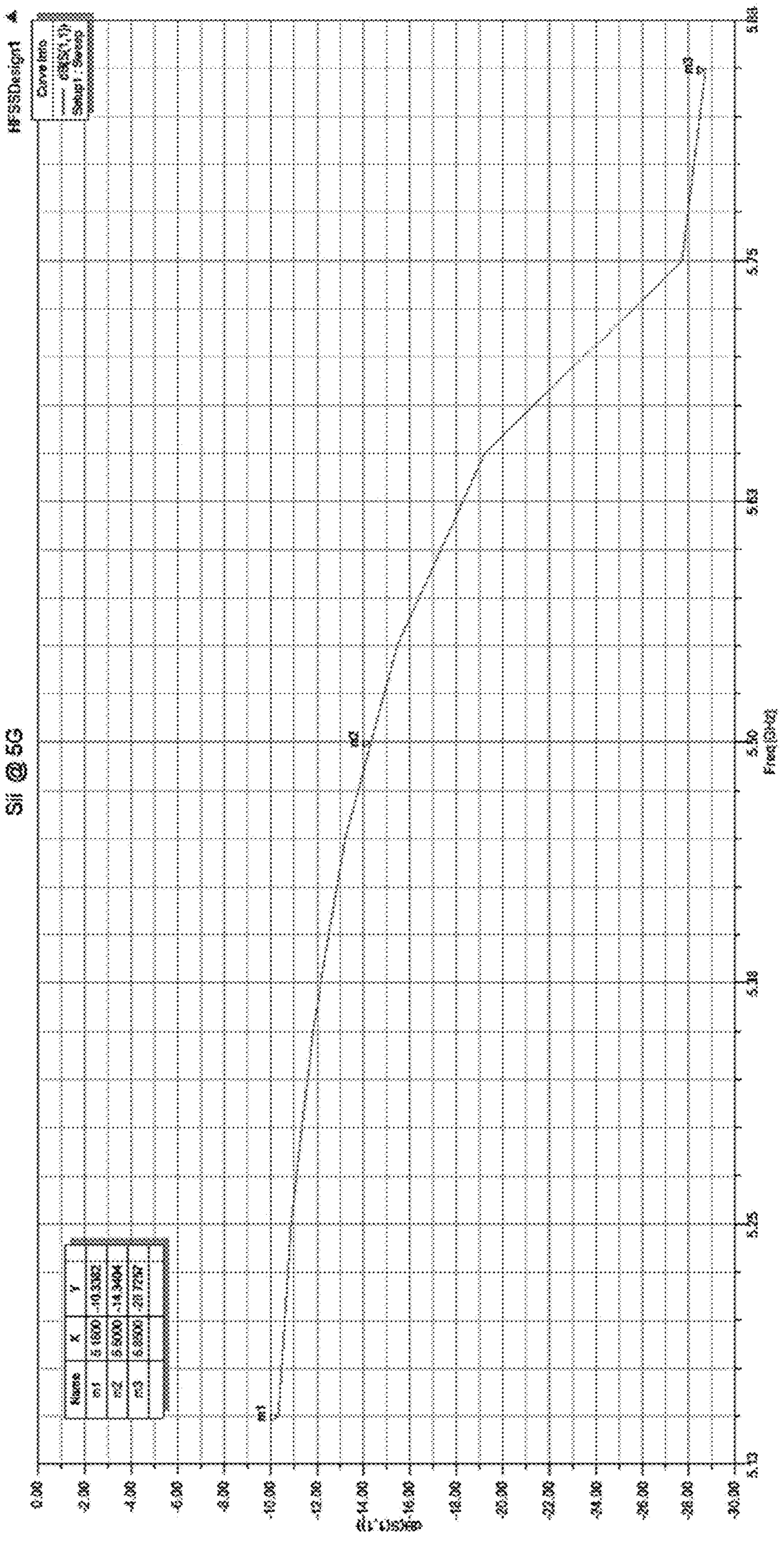
FIG. 5 is a depiction of the impedance matching of the antenna device of FIG. 1 in the omnidirectional state, according to some embodiments of the disclosure.

FIG. 5 depicts the impedance matching of the antenna device 10 in the omnidirectional state. In electronics, impedance matching is the practice of designing the input impedance of an electrical load or the output impedance of its corresponding signal source to maximize the power transfer or minimize signal reflection from the load. In FIG. 5, the matching is illustrated for S11 at a frequency range of 5.15 to 5.85 GHz. As is known to those of skill in the art, S11 is a measure of antenna efficiency that represents how much power is reflected from the antenna. This measure is known as the reflection coefficient or the return loss. For example, if S11 is 0 dBi, then all the power is reflected from the antenna, and none is radiated. If S11 is less than 0 dBi, it is an indication that a portion of the power is radiated from the antenna. The more that S11 is negative, the less the amount of power that is reflected from the antenna, and the more power is radiated from the antenna.

As seen in FIG. 5, at 5.150 GHz, the return loss, or matching (indicated on the Y-axis) is −10.3382 decibels; at 5.500 GHz, the matching is −14.3404 decibels, and at 5.850 GHz, the matching is −28.7257 decibels. Thus, each dipole antenna 14 transmits effectively at all frequencies between 5.150 and 5.850 GHz, and, from the measured range, transmits most effectively (i.e., absorbs the least amount of power, and radiates best) at 5.850 GHz.

Figure 6:
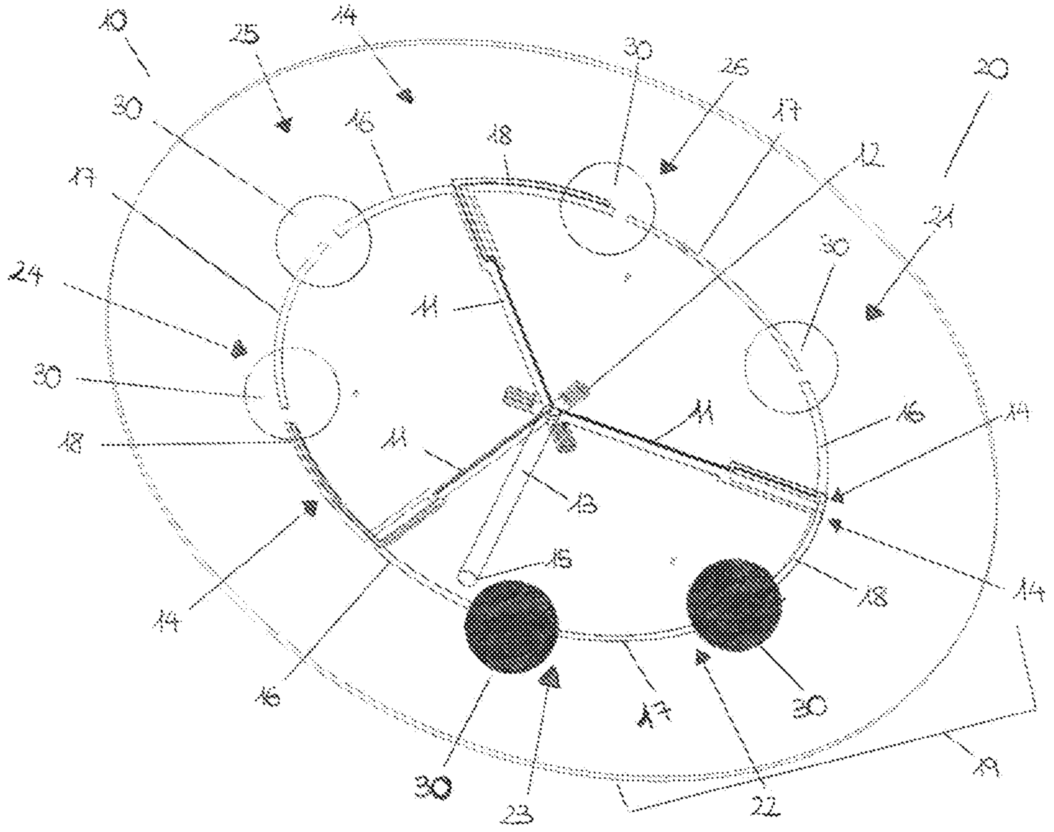
FIG. 6 is a depiction of the antenna device of FIG. 1 in a directional state, according to some embodiments of the disclosure.

Attention is now directed to FIGS. 6-10, which illustrate the antenna device 10 in a directional state. FIG. 6 illustrates the antenna device 10, which is identical to the antenna device 10 as depicted in FIG. 1, with the following exception: whereas in FIG. 1, each of the switches 30 associated with junction points 21-26 was "off," in FIG. 6, the switch 30 associated with junction points 22 and 23 are "on," and thus depicted as a filled circle, while the other switches 30 are off, and thus depicted as an open circle.

The effect of turning on the switches 30 at junction points 22 and 23 is to combine two adjacent dipole antennas 14 into a single long radiating element, or dipole antenna, 19 having two feeding points. The combined dipole antenna 19 thus extends from junction point 21, through junction points 22 and 23, which is now closed, including passive element 17 which is between junction points 22 and 23, and to junction point 24. The other dipole antenna 14 and passive elements 17 remain as they were originally. The two combined dipole antennas 14 and passive element 17 thus function as a single dipole antenna. The result of combining the two dipole antennas 14 is to change the current distribution on these dipole antennas. The energy in the combined dipole antenna 19 is lower compared to the energy in the separate dipole antennas 14. This increases the directional gain in the direction directly opposite the combined dipole antenna 19, relative to the directions in which the dipole antennas 14 are combined.

Notably, the use of switches 30 enables the antenna device 10 to be switched between a directional state and an omnidirectional state using only passive elements 17 that are situated on the perimeter of the array of dipole antennas. This permits mode switching without increasing the space requirement of the antenna device 10. The mode switching is based on using the passive elements 17 to couple multiple dipole antennas 14 to each other.

Figure 7:
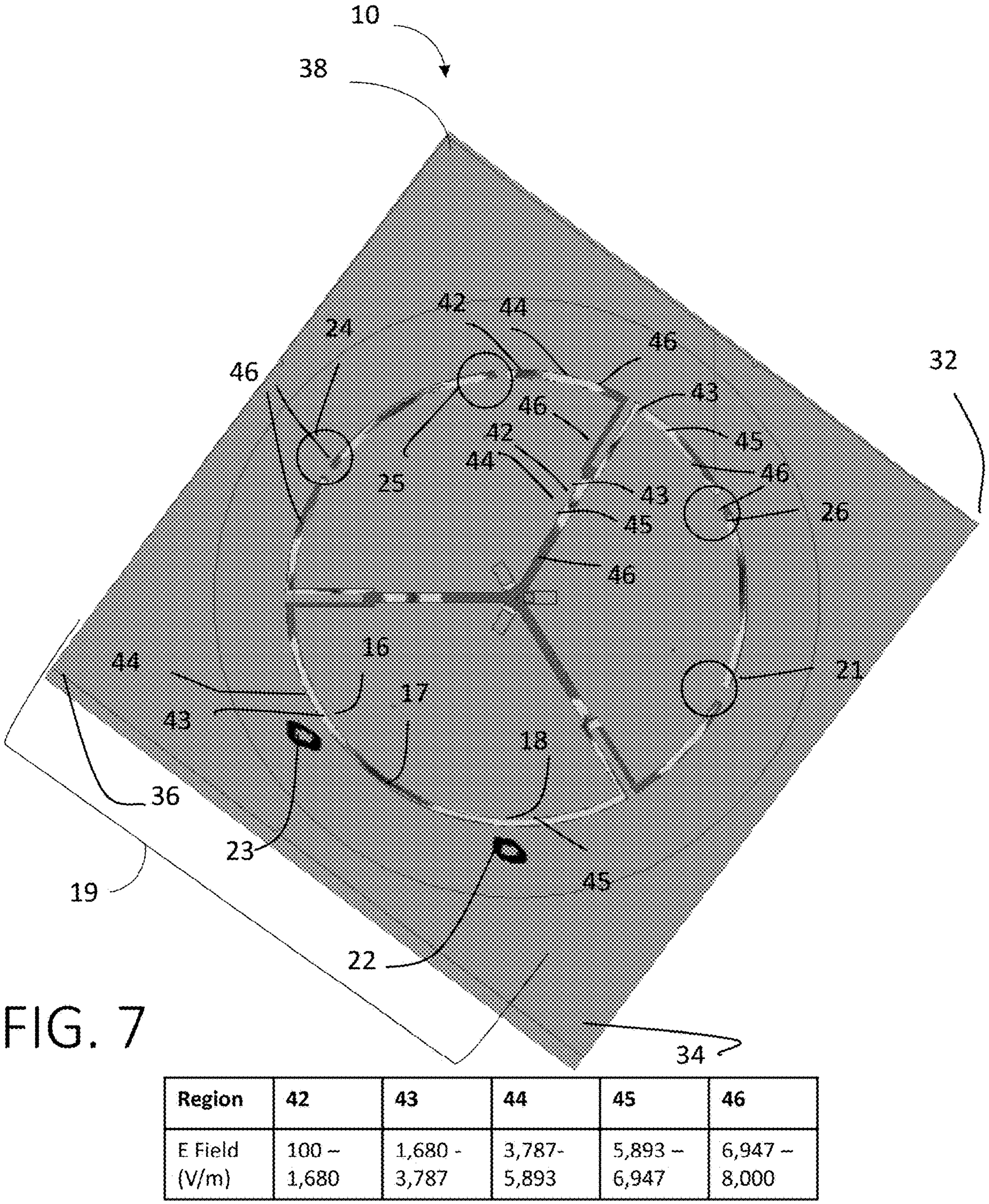
FIG. 7 is a depiction of the near electric field generated by the antenna device of FIG. 6 in the directional state, according to some embodiments of the disclosure.

FIG. 7 depicts an electric field that is generated along each dipole antenna 14 and the combined dipole antenna 19, when the antenna device 10 is in the directional state. The strength of the electric field is measured in Volts per meter (V/m). The strength of the electric field is divided into the same five regions 42, 43, 44, 45, 46 as in FIG. 2. As described above in connection with FIG. 2, it is to be recognized that the variations in electric field across antenna device 10 are continuous, rather than discrete, and the approximations of electric field for each particular region are for purposes of general explanation only.

As can be seen in FIG. 7, and in contrast to the electric field of FIG. 2, in the directional mode, the electric field is not symmetric around the entire antenna device 10. For example, the maximum energy achieved in passive elements 17 that are not part of combined dipole antenna 19 is in the highest energy region 46. Such high energy regions are located, for example, at junction points 21, 24, 25, and 26. However, no such high energy region 46 exists at closed junction points 22, 23.

Figure 8:
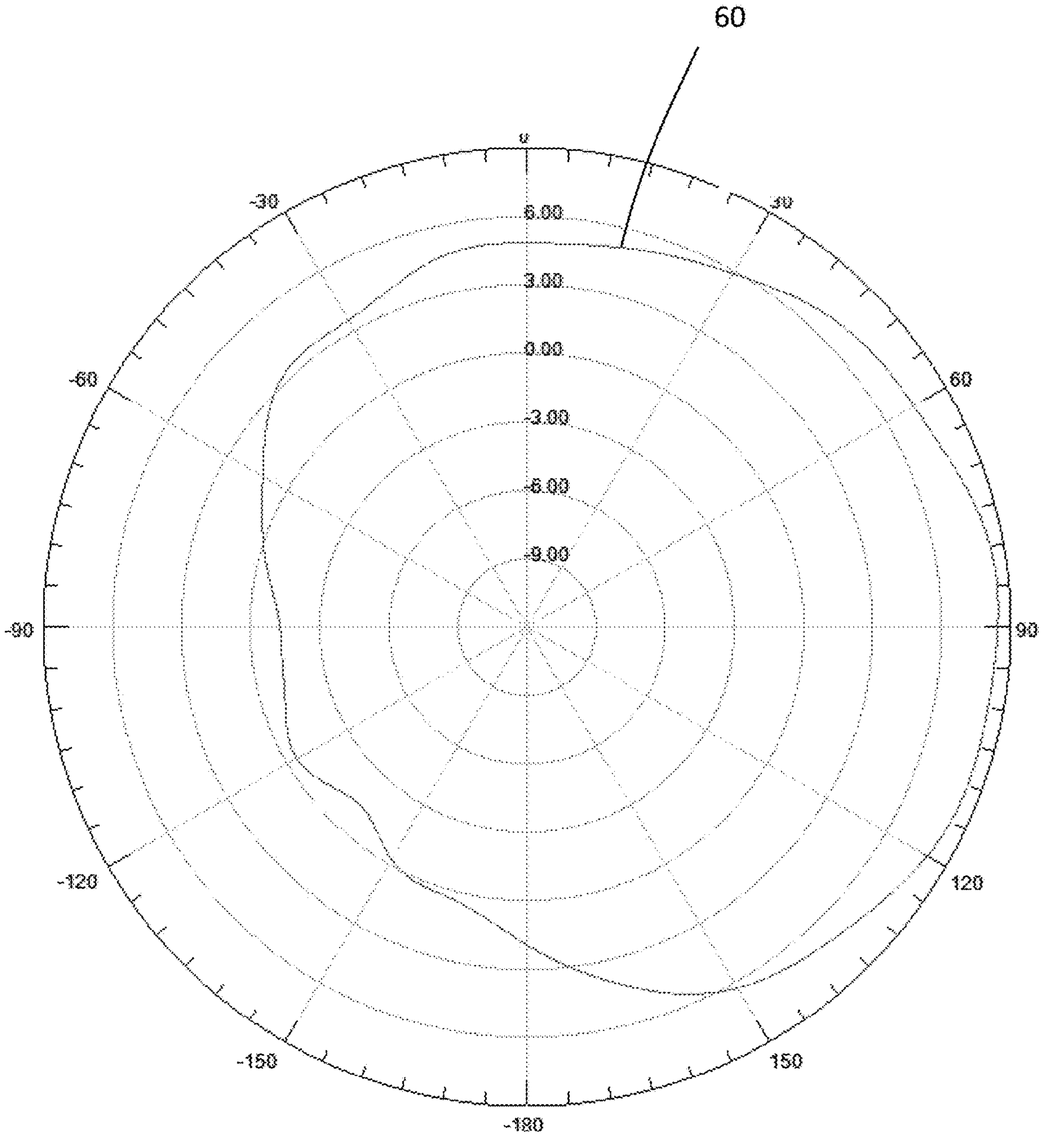
FIG. 8 is a depiction of the far electric field generated by the antenna device of FIG. 6 in the directional state, taken in the azimuthal plane at θ=135°, according to some embodiments of the disclosure.

FIG. 8 depicts the far electric field generated by antenna device 10 in the directional state. Far electric field 60 is measured in dBi as the azimuthal plane pattern, at frequency of 5.5 GHz, with theta at 135°. As can be seen, far electric field 60 exceeds 6 dBi between the angles of 30° and 150°. At angles lower than 30° and higher than 150°, the electric field 60 is lower than 6 dBi, and, between −90° and −150°, it descends to below 0 dBi. The reason that the far electric field 60 has a non-symmetrical profile is because of the asymmetry in the near electric field shown in FIG. 7. The asymmetrical near electric field over the dipoles produces strong directivity in the far electric field, in the direction opposite combined antenna 19.

Figure 9A:
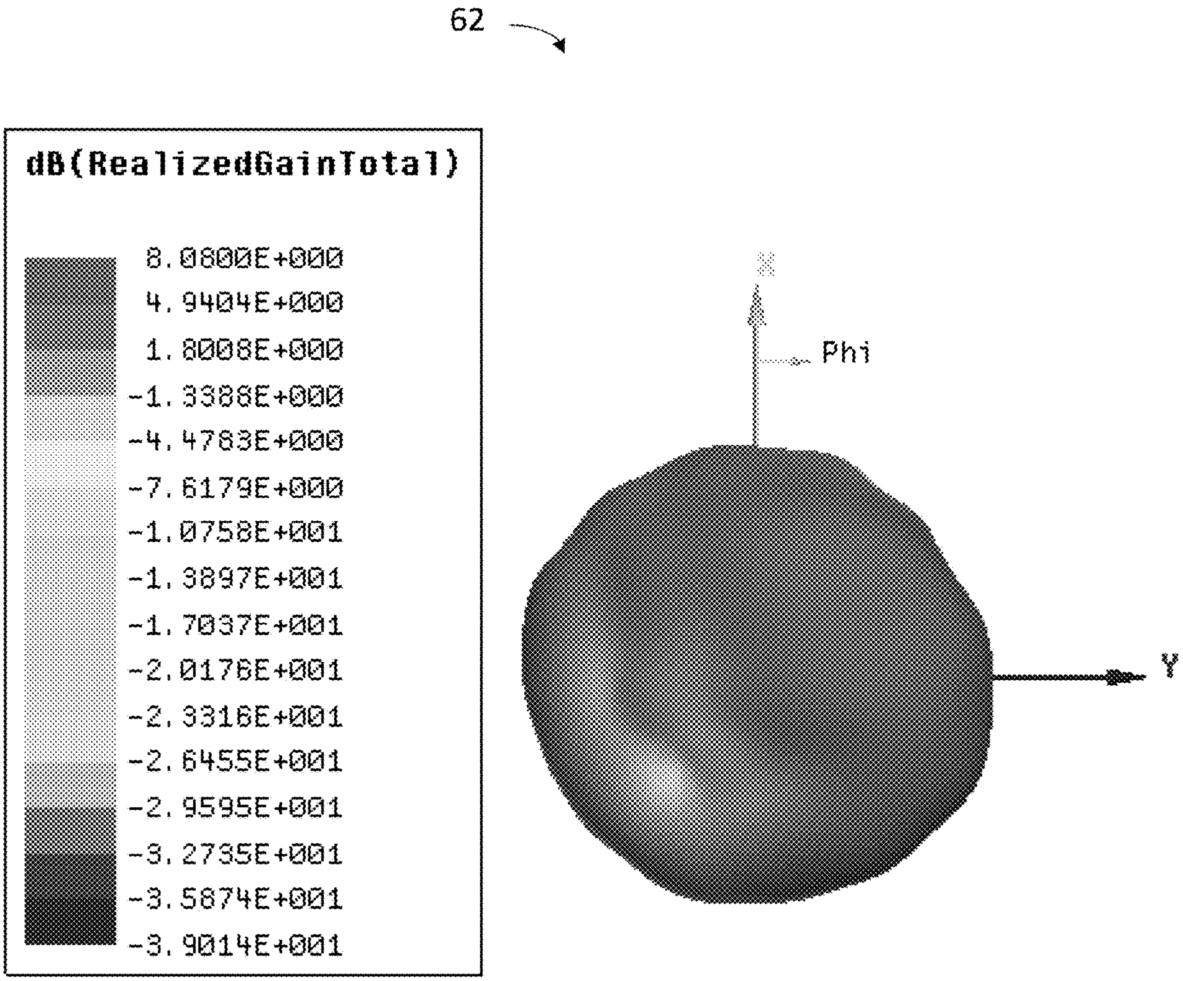
FIGS. 9A and 9B are depictions of the realized gain in total of the antenna device of FIG. 6 in the directional state, measured spherically around the antenna device, according to some embodiments of the disclosure.
Figure 9B:
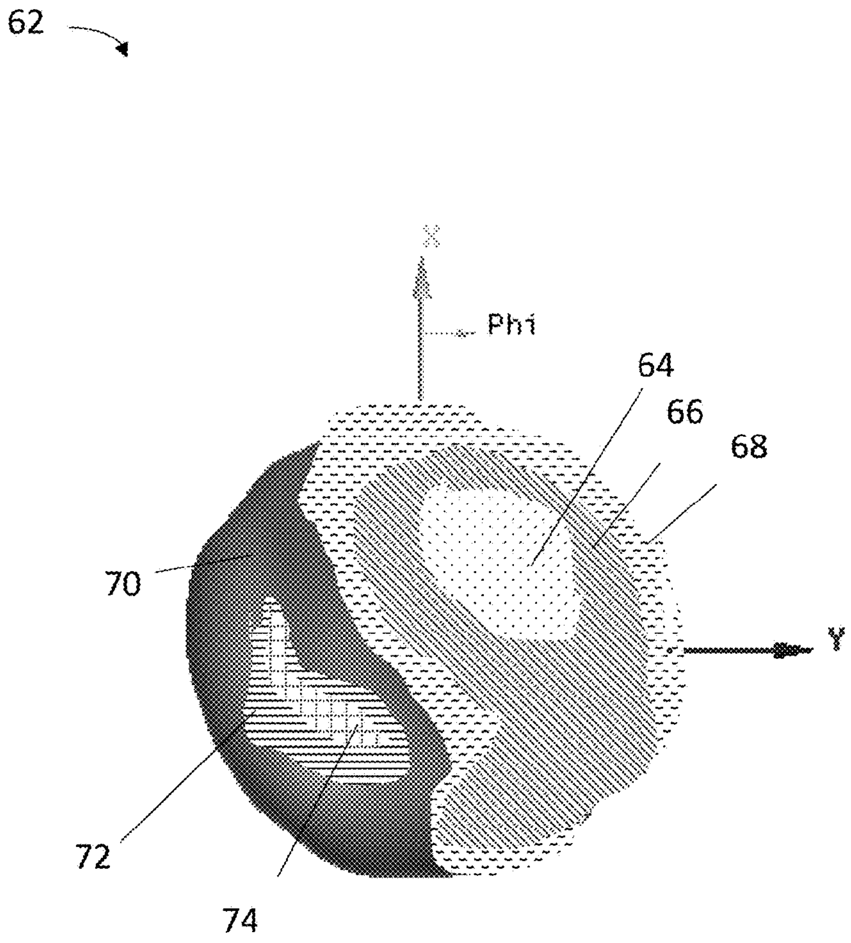

FIGS. 9A and 9B depict the gain 62 generated by the antenna device in the directional state. FIG. 9A illustrates the shape of the gain 62 profile in three dimensions, and FIG. 9B depicts the values of the gain 62 for various regions in the 3 dimensional profile, expressed in dBi. As can be seen in FIGS. 9A and 9B, in the directional state, areas of high gain 64, 66 assume an approximately hemispherical profile. The areas of low gain, such as areas 72 and 74, assume a more limited profile, and approximately correspond to the low gain area of the far electric field as depicted in FIG. 8.

As seen in FIG. 9B, the realized gain is strongly directional. In region 64, the realized gain is around 8.0800 dBi; in region 66, the realized gain is 4.9408 to 8.0800 dBi; in region 68, the realized gain is −1.3388 to 4.9404 dBi; in region 70 the realized gain is −4.4783 to −1.3388 dBi; in region 72 the realized gain is −7.8179 dBi to −4.4783 dBi; and in region 74 the realized gain is −20.176 to −7.8179 dBi.

As can be seen from a comparison of the realized gain in FIGS. 8, 9A and 9B versus FIGS. 3, 4A and 4B, the maximum gain in the directional state is more than 3 dB greater than the maximum gain in the omnidirectional state. For example, the maximum gain in region 64 of FIG. 9B is 8.0800 dBi, whereas the maximum gain in region 56 of FIG. 4B is 4.7695 dBi. Thus, the directional state provides a significantly higher gain in the desired direction, compared to the gain in that direction in the omnidirectional state.

Figure 10:
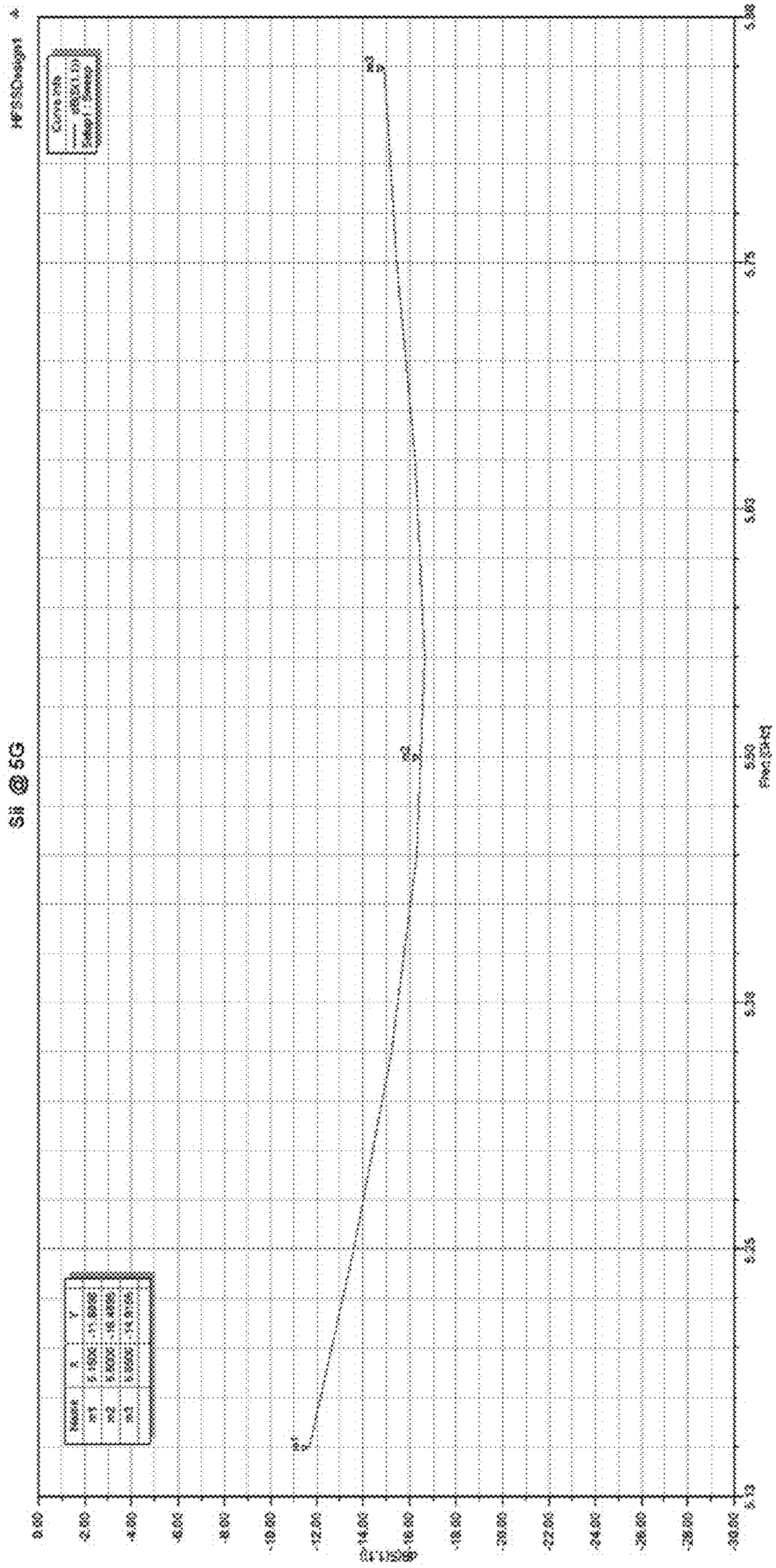
FIG. 10 is a depiction of the impedance matching of the antenna device of FIG. 6 in the directional state, according to some embodiments of the disclosure.

FIG. 10 depicts the impedance matching of the antenna device 10 in the directional state. In FIG. 10, the matching is illustrated for S11 at a frequency of around 5.50 GHz. As seen in FIG. 10, at 5.150 GHz, the matching (indicated on the Y-axis) is −11.6898 decibels; at 5.500 GHz, the matching is −16.4896 decibels, and at 5.850 GHz, the matching is −14.9166 decibels.

A comparison of FIG. 10 and FIG. 5 shows that, in both the omnidirectional and directional states, there is a wide band of frequencies with matching below −10 decibels. The matching is below −10 decibels across the entire range of 5.150 to 5.850 GHz.

The presence of passive elements 17 plays an important role in enabling the above-described wide band matching. One of the main problems in design of smart antennas is matching. In the described embodiment, there is an array of three dipole antennas 14 on a single feeding network. Usually, with careful design of dipoles and their feeding network, one can get good matching for a single state, e.g., the omnidirectional state of the depicted embodiment. But, in the depicted embodiment, a single feeding network should be designed that provides good matching in two states, omnidirectional and directional. With careful design of the passive elements 17, i.e., with specific calculation of their length and width (e.g., a length that is half the transmitted wavelength), it is possible to achieve wide matching in both the omnidirectional and directional mode (based on the principle that two dipole antennas 14 and one passive element 17 turn into a single radiating element 19 with two excitations).

The described antenna device 10 has many other benefits compared to alternative devices. The structure of antenna device 10 has a small form-factor, which enables it to be included in a small size access point. Furthermore, the ability to achieve high gain in the omnidirectional mode enables achieving low error vector magnitude (EVM) with relatively high transmission power (high effective isotropic radiation power (EIRP)). Furthermore, the unique mechanism of the beam diversion in directional mode provides high additional gain. The antenna device 10 may be manufactured very simply, e.g., as a PCB trace antenna, and thus is cost-effective.

Figure 11:
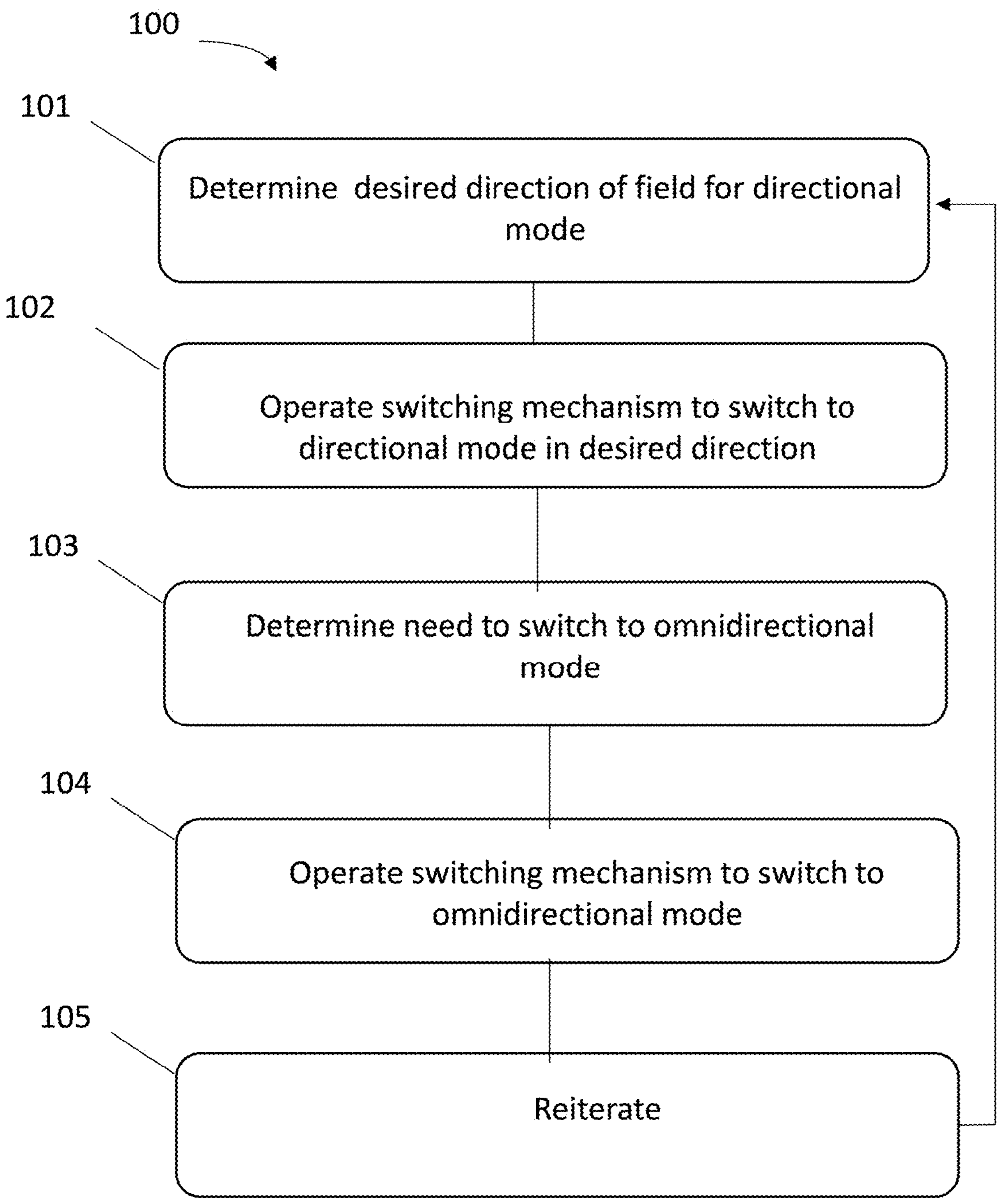
FIG. 11 is a depiction of steps of a method of switching an antenna device from an omnidirectional state to a directional state, according to some embodiments of the disclosure.

FIG. 11 depicts steps of a method 100 of switching an antenna device 10 from an omnidirectional state to a directional state, according to some embodiments of the disclosure. Antenna device 10 comprises a plurality of dipole antennas 14 and a common port 12. Each of the dipole antennas 14 is connected to the common port 12. The plurality of dipole antennas 14 are arranged around the port 12. Each of the plurality of dipole antennas 14 comprises two ends 16, 18. The antenna device further comprises a plurality of passive elements 17 interchangeably arranged around the port 12 such that each of the plurality of passive elements 17 is situated between two different antennas 14 from the plurality of dipole antennas 14. The antenna device 10 further comprises one or more switches 30 configured to switch between (1) an omnidirectional state, in which the ends 16, 18 of the dipole antennas 14 are not connected to the plurality of passive elements 17; and (2) a directional state, in which at least one of the plurality of passive elements 17 is connected to at least one end 16, 18 of one of the plurality of dipole antennas 14.

The method commences when antenna device 10 is in the omnidirectional state, which may be a default state. At step 101, the device 10 optionally determines a desired direction of field for the directional state. This determination may be based on the detection of one or more mobile devices in the vicinity of antenna device 10, e.g., when the one or more mobile devices are clustered in a particular direction relative to the antenna device 10. The antenna device may be part of a smart antenna that may be toggled back and forth between the omnidirectional and directional states according to the needs of the environment, e.g., the sensing of mobile devices within a given range of the antenna device.

At step 102, one or more switchings 30 are operated, to switch antenna device 10 from the omnidirectional state to the directional state, so that the device 10 will generate a directional field in the desired direction. The operating step 102 comprises switching the antenna device 10 from an omnidirectional state, in which none of the ends of passive elements 17 and dipole antennas 14 connect to each other, to a directional state, in which at least one end of at least one of the passive elements 17 is connected to at least one end of one of the dipole antennas 14. The operating step 102 comprises operating the one or more switches 30 to connect an adjacent passive element 17 and dipole antennas 14.

Advantageously, the method may be used to switch the antenna device between the omnidirectional state and the directional state using only passive elements that are situated on the perimeter of the array of dipole antennas. This permits mode switching without increasing the space requirement of the antenna device. In the omnidirectional state, when the dipole antennas are not connected to each other, the antenna device provides a high gain pattern in the azimuthal plane. The antenna device is also convertible to a high gain directional pattern in the azimuthal plane, when two ends in each of one or more of the pairs are connected to each other.

At step 103, the method further comprises determining when to revert the antenna device back to the omnidirectional state. This determination may be based on the detection of one or more mobile devices in the vicinity of antenna device 10, e.g., at numerous directions around the antenna device 10. At step 104, the method further comprises operating the one or more switches 30, and thereby switching the antenna device back from the directional state to the omnidirectional state. In this implementation, the antenna device 10 is part of a smart antenna that may be toggled back and forth between the omnidirectional and directional states according to the needs of the environment, e.g., the location of mobile devices within a given range of the antenna device 10.

At step 105, the method is reiterated. That is, upon detection of one or more devices in a single direction relative to the antenna device 10, the antenna device 10 may be switched back to the directional state, in the manner described above.

As can be understood by those of skill in the art, each of the measurements for the electric field, gain, and impedance matching of the antenna device 10 discussed above are for one particular embodiment of the antenna device 10. Adjustments in various parameters of the antenna device 10, such as the length of arms 16, 18, the length of passive elements 17, the length of feeding arm 11, the orientation of the dipole antennas 14 and passive elements 17 around the port 12, the structure of the closed shape formed by the dipole antennas 14 and passive elements 17, the size and location of ground plane 20 relative to the dipole antennas 14, and the energy delivered from power source 15, all influence the electric field, gain, and impedance matching. Accordingly, the values described above should be understood in an exemplary, as opposed to a limiting, sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant dipole antennas and passive elements will be developed and the scope of the term dipole antenna and passive element is intended to include all such new technologies a priori.

As used herein the term “about” refers to ±10%.

The terms “comprises”, “comprising”, “includes”, “including”, “having” and their conjugates mean “including but not limited to”. This term encompasses the terms “consisting of” and “consisting essentially of”.

The phrase “consisting essentially of” means that the composition or method may include additional ingredients and/or steps, but only if the additional ingredients and/or steps do not materially alter the basic and novel characteristics of the claimed composition or method.

As used herein, the singular form “a”, “an” and “the” include plural references unless the context clearly dictates otherwise. For example, the term “a compound” or “at least one compound” may include a plurality of compounds, including mixtures thereof.

The word “exemplary” is used herein to mean “serving as an example, instance or illustration”. Any embodiment described as “exemplary” is not necessarily to be construed as preferred or advantageous over other embodiments and/or to exclude the incorporation of features from other embodiments.

The word “optionally” is used herein to mean “is provided in some embodiments and not provided in other embodiments". Any particular embodiment of the disclosure may include a plurality of "optional" features unless such features conflict.

Throughout this disclosure, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with exemplary embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An antenna device, the antenna device comprising:

a plurality of dipole antennas and a port, wherein each of the dipole antennas is connected to the port, wherein the plurality of dipole antennas are arranged around the port, and wherein each of the dipole antennas comprises two ends;

a plurality of passive elements comprising ends, wherein the ends of the plurality of dipole antennas and the ends of the plurality of passive elements are interchangeably arranged around the port such that each of the plurality of passive elements is situated between the ends of two different antennas from the plurality of dipole antennas; and one or more switches configured to switch between an omnidirectional state, in which the ends of the dipole antennas are not connected to the plurality of passive elements, and a directional state, in which at least one of the ends of one of the plurality of passive elements is connected to at least one of the ends end of one of the plurality of dipole antennas.

2. The antenna device of claim 1, wherein the switches are configured such that, in the directional state, at least two ends of one of the plurality of passive elements are connected to two different antennas, of the plurality of dipole antennas, thereby converting the two different antennas into a single long radiating element having two feeding points.

3. The antenna device of claim 1, wherein the plurality of dipole antennas and the plurality of passive elements are arranged around the port in a substantially circular or a substantially rectangular orientation.

4. The antenna device of claim 1, wherein the plurality of dipole antennas are arranged horizontally above a ground plane.

5. The antenna device of claim 1, wherein the plurality of dipole antennas comprise at least three dipole antennas.

6. The antenna device of claim 1, wherein the passive elements are metal strips.

7. The antenna device of claim 1, wherein the switches are configured such that, in the omnidirectional state, the gain in the entire azimuth plane is at least 4 dBi.

8. The antenna device of claim 1, wherein, the difference in gain between the omnidirectional state and the directional state is at least 3 dB.

9. The antenna device of claim 1, the antenna device comprising electronic circuitry configured to connect and disconnect each of the passive elements and an adjacent antenna, of the plurality of dipole antennas, and wherein the antenna device is configured to execute a control algorithm for determining which of the passive elements to connect to an adjacent antenna, of the plurality of dipole antennas, in order to steer an antenna beam of the antenna device in a directional state towards a location of one or more mobile devices.

10. The antenna device of claim 1, wherein the one or more switches comprise at least one of a diode, a transistor, or an electronic switch.

11. A method for switching an antenna device from an omnidirectional state to a directional state, the antenna device comprising a plurality of dipole antennas and a port, each of the dipole antennas being connected to the port, the antenna device comprising a plurality of passive elements, the plurality of passive elements being interchangeably arranged around the port such that each of the plurality of passive elements is situated between two different antennas from the plurality of dipole antennas, and the antenna device comprising one or more switches configured to switch between the omnidirectional state, in which the ends of the dipole antennas are not connected to ends of the plurality of passive elements, and the directional state, in which at least one of the ends of one of the plurality of passive elements is connected to at least one of the ends of one of the plurality of dipole antennas, the method comprising:

operating the one or more switches to connect the at least one of the ends of at least one of the plurality of passive elements to the at least one of the ends of one of the plurality of dipole antennas, and thereby switching the antenna device from the omnidirectional state to the directional state.

12. The method of claim 11, the method further comprising connecting at least one of the plurality of passive elements to two different antennas, of the plurality of dipole antennas, thereby converting the two different antennas into a single long radiating element having two feeding points.

13. The method of claim 11, the method further comprising increasing the gain between the omnidirectional state and the directional state in at least one direction by at least 3 dB.

14. The method of claim 11, the method further comprising determining which direction to steer an antenna beam of the antenna device towards a location of one or more mobile devices.

15. The method of claim 11, the method further comprising determining when to revert the antenna device back to the omnidirectional state, and operating the one or more switches, and thereby switching the antenna device back from the directional state to the omnidirectional state.

* * * * *